United States Patent
Zenou et al.

(10) Patent No.: US 11,203,154 B2
(45) Date of Patent: Dec. 21, 2021

(54) SYSTEMS AND METHODS FOR PREVENTING OXYGEN INHIBITION OF A LIGHT-INITIATED POLYMERIZATION REACTION IN A 3D PRINTING SYSTEM USING INERT GAS

(71) Applicant: IO Tech Group Ltd., London (GB)

(72) Inventors: Michael Zenou, Hashmonaim (IL); Ziv Gilan, Kfar-harif (IL); Daniel Liptz, Jerusalem (IL); Yuval Shai, Hashmonaim (IL)

(73) Assignee: IO Tech Group Ltd., London (GB)

( * ) Notice: Subject to any disclaimer, the term of this patent is extended or adjusted under 35 U.S.C. 154(b) by 112 days.

(21) Appl. No.: 16/703,417

(22) Filed: Dec. 4, 2019

(65) Prior Publication Data

US 2020/0180225 A1    Jun. 11, 2020

Related U.S. Application Data

(60) Provisional application No. 62/777,902, filed on Dec. 11, 2018.

(51) Int. Cl.
*B29C 64/264* (2017.01)
*B29C 64/245* (2017.01)
(Continued)

(52) U.S. Cl.
CPC ........ *B29C 64/264* (2017.08); *B29C 35/0288* (2013.01); *B29C 35/0805* (2013.01);
(Continued)

(58) Field of Classification Search
CPC .................................................. B29C 64/371
See application file for complete search history.

(56) References Cited

U.S. PATENT DOCUMENTS

| | | | |
|---|---|---|---|
| 5,059,266 A | * | 10/1991 | Yamane ................ B29C 64/112 |
| | | | 425/174.4 |
| 5,143,817 A | | 9/1992 | Lawton et al. |
| (Continued) | | | |

FOREIGN PATENT DOCUMENTS

| | | |
|---|---|---|
| EP | 0435564 A2 | 7/1991 |
| EP | 3 147 047 A1 | 3/2017 |

OTHER PUBLICATIONS

International Search Report and Written Opinion dated Feb. 17, 2020, from the ISA/European Patent Office, for International Application No., 13 pages.

(Continued)

*Primary Examiner* — Timothy Kennedy
(74) *Attorney, Agent, or Firm* — Ascenda Law Group, PC

(57) ABSTRACT

Systems and methods that prevent oxygen inhibition of a light-initiated polymerization reaction by purging the oxygen from reaction surfaces using inert gas flow. In some embodiments, oxygen is purged using a gas diffusion system that introduces, via a diffuser, an inert gas into a workspace between a UV light source and a UV curable layer of a workpiece. The diffuser may be made of a transparent or diffuse material to allow UV light to pass through it, and includes an array of micro-holes for the gas to pass through towards the workpiece. The inert gas flow may be heated to maintain a desired and uniform reaction temperature.

12 Claims, 7 Drawing Sheets

(51) Int. Cl.
  *B29C 64/106* (2017.01)
  *B29C 64/371* (2017.01)
  *B29C 35/02* (2006.01)
  *B29C 35/08* (2006.01)
  *B29C 59/04* (2006.01)
  *B33Y 10/00* (2015.01)
  *B33Y 30/00* (2015.01)
  *B33Y 40/00* (2020.01)

(52) U.S. Cl.
  CPC ............ *B29C 59/04* (2013.01); *B29C 64/106* (2017.08); *B29C 64/245* (2017.08); *B29C 64/371* (2017.08); *B29C 2035/0827* (2013.01); *B33Y 10/00* (2014.12); *B33Y 30/00* (2014.12); *B33Y 40/00* (2014.12)

(56) References Cited

U.S. PATENT DOCUMENTS

| | | |
|---|---|---|
| 5,447,822 A | 9/1995 | Hull et al. |
| 2010/0259589 A1 | 10/2010 | Barry et al. |
| 2012/0090691 A1 | 4/2012 | Baluja et al. |
| 2012/0126457 A1 | 5/2012 | Abe et al. |
| 2018/0015542 A1 | 1/2018 | Muranaka |
| 2018/0079004 A1 | 3/2018 | Herzog et al. |
| 2019/0270242 A1 | 9/2019 | Medalsy |

OTHER PUBLICATIONS

Written Opinion of the International Preliminary Examining Authority dated Nov. 13, 2020, from the IPEA/European Patent Office, for International Patent Application No. PCT/IB2019/060453 (filed Dec. 4, 2019), 5 pages.
Written Opinion of the International Preliminary Examining Authority dated Nov. 13, 2020, from the IPEA/European Patent Office, for International Patent Application No. PCT/IB2019/060451 (filed Dec. 4, 2019), 4 pages.
Non-Final Office Action dated Apr. 30, 2021, for U.S. Appl. No. 16/703,423, filed Dec. 4, 2019, 13 pgs.
International Search Report and Written Opinion dated Feb. 18, 2020, from the ISA/European Patent Office, for International Application No. PCT/IB2019/060453, 12 pages.
International Preliminary Report on Patentability dated Mar. 31, 2021, from the IPEA/European Patent Office, for International Patent Application No. PCT/IB2019/060453 (filed Dec. 4, 2019), 12 pgs.
International Preliminary Report on Patentability dated Mar. 29, 2021, from the IPEA/European Patent Office, for International Patent Application No. PCT/IB2019/060451 (filed Dec. 4, 2019), 10 pgs.
Amendment filed Jun. 24, 2021, for U.S. Appl. No. 16/703,423, filed Dec. 4, 2019, 7 pgs.
International Search Report and Written Opinion dated Feb. 17, 2020, from the ISA/European Patent Office, for International Application No. PCT/IB2019/060451; 13 pages.

* cited by examiner

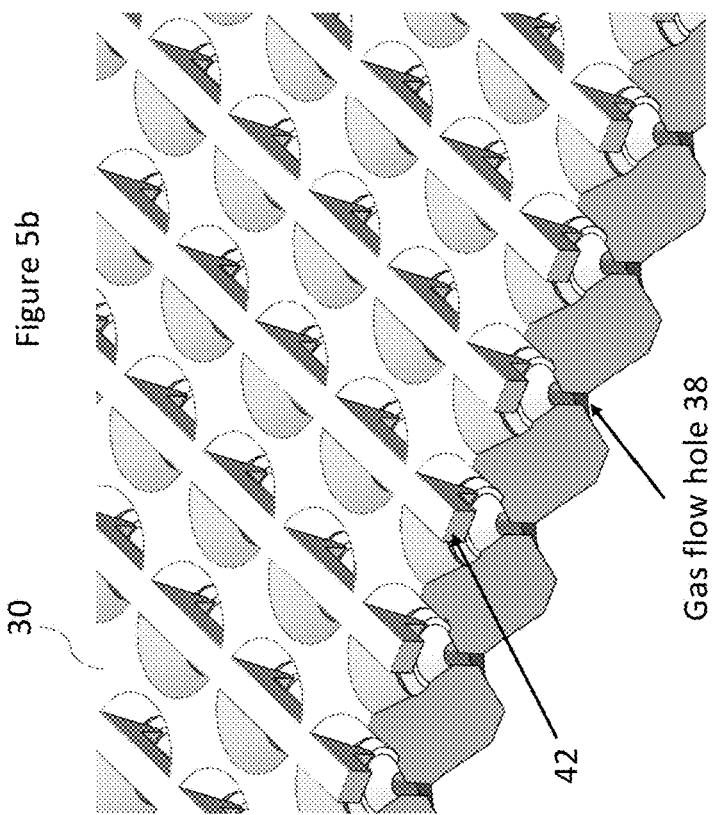
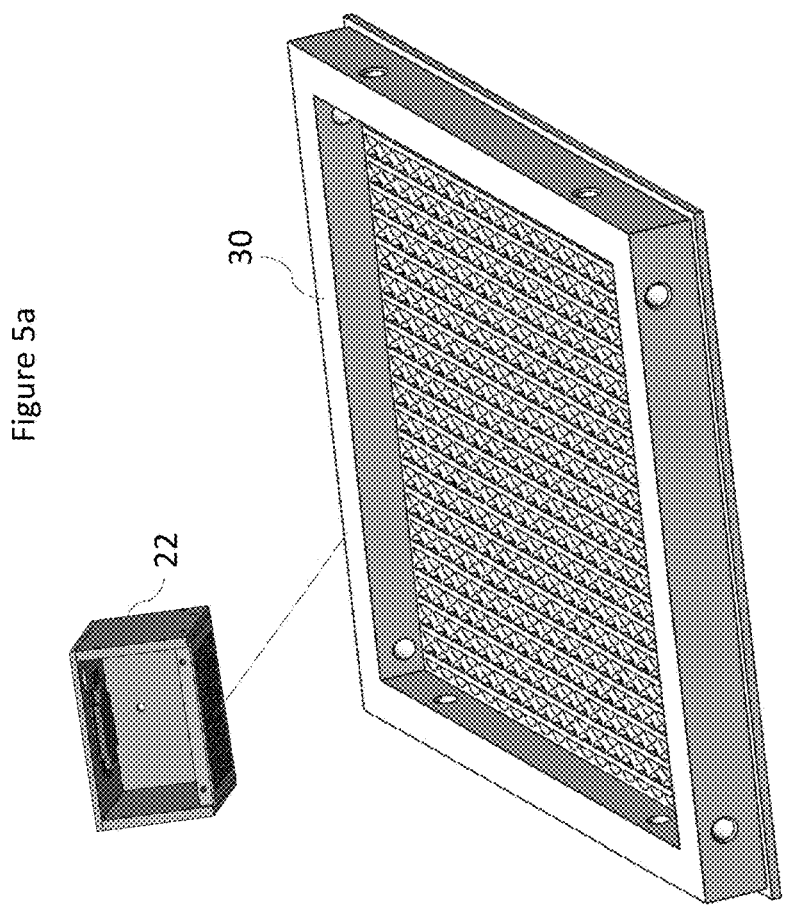

SYSTEMS AND METHODS FOR PREVENTING OXYGEN INHIBITION OF A LIGHT-INITIATED POLYMERIZATION REACTION IN A 3D PRINTING SYSTEM USING INERT GAS

RELATED APPLICATIONS

This is a NONPROVISIONAL of, claims priority to, and incorporates by reference U.S. Provisional Application No. 62/777,902, filed Dec. 11, 2018.

FIELD OF THE INVENTION

The present invention relates to a system that prevents oxygen inhibition of a light-initiated polymerization reaction used by a 3D printing system by purging the oxygen from the reaction surface using inert gas flow.

BACKGROUND

Many additive manufacturing, or so-called three-dimensional ("3D") printing, applications use ultraviolet ("UV") light-curable polymers. The UV curing process consists of three stages: photoinitiation, propagation, and termination. During photoinitiation, a photoinitiator produces free radicals when exposed to UV radiation. These free radicals react with nearby monomers and convert them into free radicals. Next, in the propagation stage, the free radical monomers bond with other monomers and turn those monomers into free radicals. In this way the monomers form a polymer chain. The process continues until it reaches termination. Termination can occur in many ways, including if two chains bond with one another, the free radical transfers to a monomer, or if the chain reacts with molecules from the environment and not a monomer.

There are two interactions between oxygen and the photopolymer that inhibit curing: quenching and scavenging. After the photoinitiator has been excited by exposure to UV radiation, it produces a free radical. Molecular oxygen easily reacts with this free radical, preventing it from reacting with monomers in the process of chain propagation. This is the quenching reaction. This reaction also produces an oxygen free radical. In the scavenging reaction, this oxygen free radical reacts with a free radical that is part of a propagating polymer chain. This reaction results in a less reactive free radical, which leads to early termination of the polymerization process. These two processes can be written as:

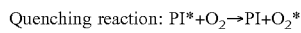

Quenching reaction: $PI^* + O_2 \rightarrow PI + O_2^*$

Scavenging reaction: $R\cdot + O_2^* \rightarrow R\text{—}O\text{—}O\cdot$

Because of these phenomena, if a photopolymer is exposed to oxygen during curing in a 3D printing process it can result in uncured polymer residue on surfaces exposed to the air.

SUMMARY OF THE INVENTION

In one embodiment of the invention, a UV curing system includes a gas diffusion system for introducing an inert gas into a workspace between a UV light source and a UV curable layer of a workpiece. A transparent cover separates the UV light source and the workspace and the inert gas (e.g., Ar, $CO_2$, He, Ne, etc.) flows in from gas inlets and out through a diffuser towards the workpiece. A gas pressure homogenizer is used to ensure constant pressure throughout the system.

The diffuser is made of a transparent or diffuse material to allow UV light from the UV light source to pass through it. The diffuser includes an array of micro-holes for the inert gas to pass through towards the workpiece. The small diameter of the holes allows a closed-packed array thereof so that the gas is evenly distributed throughout the workspace (i.e., throughout the curing area). The small diameter of the holes also means that a larger area of the surface of the diffuser is free of holes making its optical properties more homogenous. This ensures a relatively even light distribution. The holes are covered with "bridges" of the UV-transparent material of which the diffuser is made. This ensures that all light passing through the diffuser passes through at least some thickness of the transparent material, further improving light distribution.

After the UV curable material has been deposited on the surface of the workpiece, and the workpiece introduced into the workspace of the UV curing system, the inert gas is pumped through the diffuser. This flow of gas purges the oxygen from the region of the workspace adjacent to the diffuser. The thickness of this region is related to the gas pressure as it is forced through the diffuser. With the workpiece maintained in the area of the workspace from which oxygen has been purged, the UV curing system then cures the layer of UV curable material through exposure to light from the UV light source.

A further embodiment of the invention provides for preventing oxygen inhibition of a light-initiated polymerization reaction by periodically emitting a UV light from a UV light source into a UV curing space in which a workpiece having a layer of UV curable material is disposed to facilitate, within the UV curing space, UV curing of the UV curable material, and purging oxygen from the UV curing space at times when the UV light source emits light onto the layer of UV curable material. Purging oxygen from the UV curing space includes introducing, via a gas diffusion system, an inert gas into a workspace between the UV light source and the layer of UV material of the workpiece. For example, the inert gas may introduced via one or more gas inlets of the gas diffusion system and through a plurality of micro-holes in a transparent diffuser separating the UV light source and the workspace towards the workspace. The UV light from the UV light source may be transmitted through bridges of a UV transparent material arranged over the micro-holes of said diffuser towards the layer of UV material of the workpiece. Thus, the inert gas and the UV light are each approximately evenly distributed throughout the workspace via the micro-holes.

In some embodiments of the invention, the inert gas flow is used to evenly heat the UV curable material during curing or to control the temperature of the UV curing space by controlling the inert gas temperature.

These and further embodiments of the invention are described below with reference to the accompanying drawings, in which the present invention is illustrated by way of example, and not limitation.

BRIEF DESCRIPTION OF THE DRAWINGS

FIGS. 5a and 5b illustrate aspects of the gas diffuser arrangement shown in FIG. 4.

DETAILED DESCRIPTION

Figure 1C:
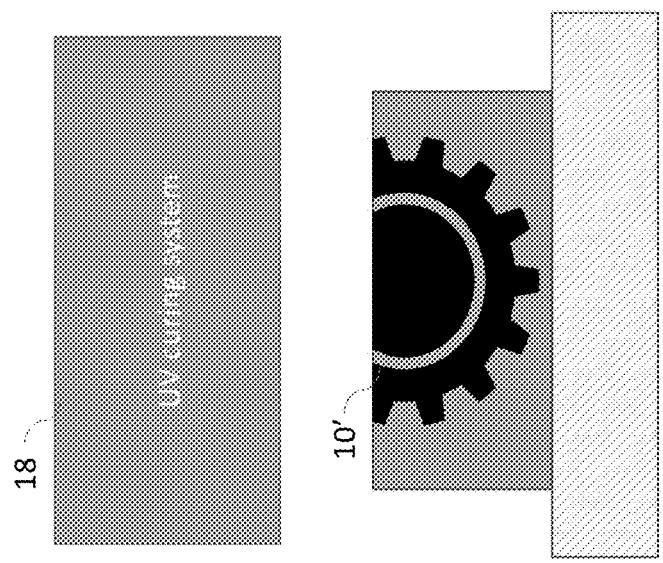
FIGS. 1a-1c illustrate points in a conventional 3D printing process in which an object to be printed (FIG. 1a) has deposited thereon a layer of UV curable material (FIG. 1b), which is subsequently cured through exposure to UV light (FIG. 1c).
Figure 1B:
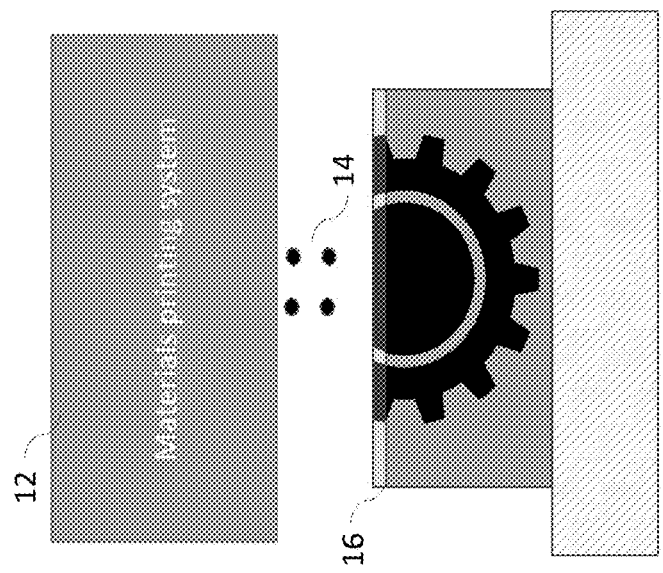
Figure 1A:
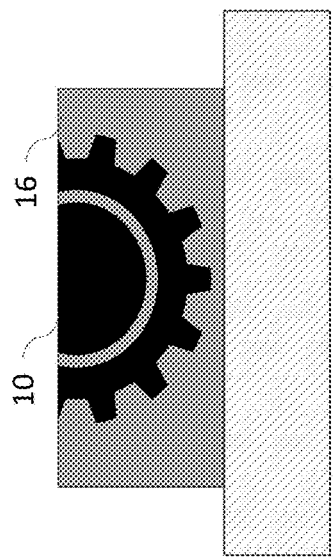

Before describing the invention in detail, it is helpful to present an overview. Referring to the sequence of images shown in FIGS. 1a, 1b, and 1c, in many 3D printing processes in which an object 10 is undergoing fabrication, a materials printing system 12 is used to deposit UV curable material 14 on a surface 16. This deposited material is then cured with a UV light source 18 to produce a new layer of the desired part 10'. This process continues until the part undergoing fabrication is completed.

Figure 2:
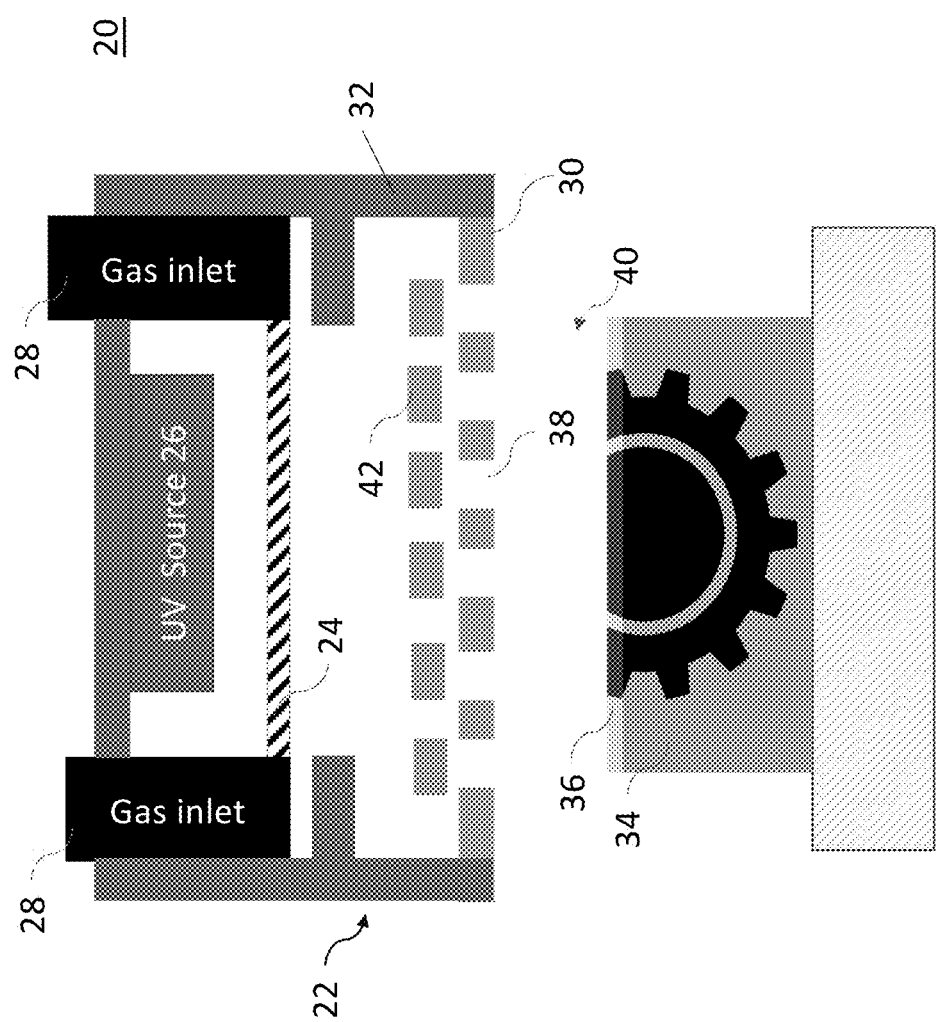
FIG. 2 illustrates a UV curing system configured in accordance with one embodiment of the invention in which an inert gas flow is arranged to prevent oxygen inhibition of the polymerization process during a UV curing process.

Embodiments of the invention provide systems and methods for preventing oxygen inhibition of a light-initiated polymerization reaction at ambient conditions. Referring now to FIG. 2, in one embodiment of the present invention a UV curing system 20 is equipped with a gas diffusion system 22. A transparent cover 24 is disposed between the UV light source 26 and the gas diffusion system 22. The gas flows in from gas inlets 28 and out through a diffuser 30 at the bottom of the system. A gas pressure homogenizer 32 is used to ensure constant pressure throughout the system.

The diffuser 30 is made of a transparent or diffuse material to allow UV light to pass through it onto a workpiece 34, and in particular onto a layer of UV curable material 36 disposed thereon. The diffuser 30 consists of an array of micro-holes 38. The small diameter of the micro holes allows for a closed-packed array thereof so that the gas is evenly distributed throughout the curing area 40. The small diameter of the micro-holes 38 also means that a larger area of the surface of the diffuser 30 is free of holes, making its optical properties more homogenous. This ensures more even light distribution. Of course, other arrangements and sizing of the micro-holes may be employed so as to optimize gas distribution and light distribution throughout the curing area. The micro-holes 38 are covered with "bridges" 42 of the material of which the diffuser is made. This ensures that all light passing through the diffuser must pass through some region of the transparent material. This further improves the light distribution.

Figure 3B:
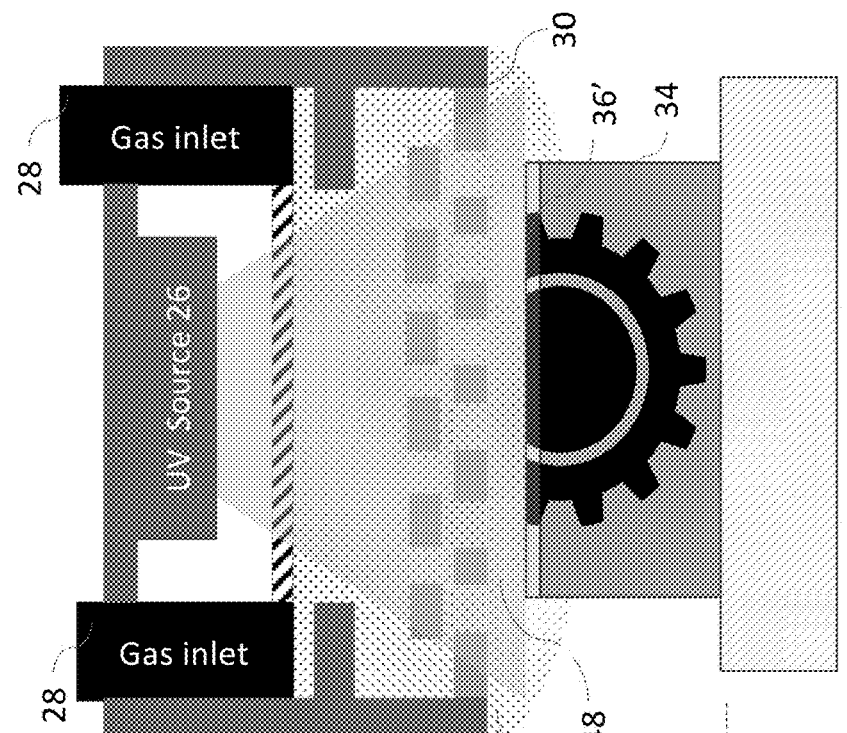
FIGS. 3a and 3b illustrate aspects of the operation of the UV curing system shown in FIG. 2.
Figure 3A:
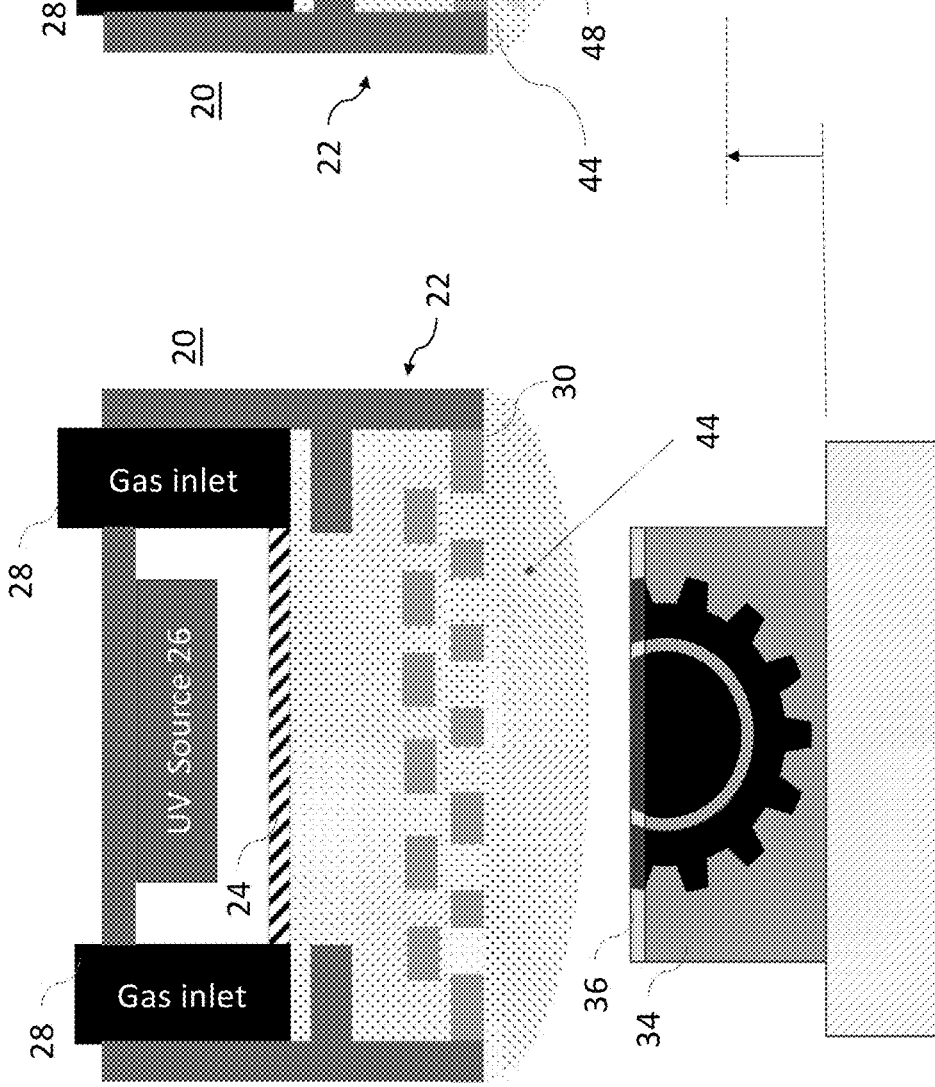

Referring now to FIG. 3a, after the UV curable material 36 has been deposited on the print surface, the gas is pumped through the diffuser 30 via the gas inlets 28. This flow of gas purges the oxygen from a region 44 adjacent to the diffuser 30. The thickness of this region is related to the gas pressure as it is forced through the diffuser. Thereafter, as shown in FIG. 3(b), if necessary the device under fabrication is raised iso that the layer of UV curable material 36 disposed thereon is disposed within the oxygen-free region 44, and the UV source 26 of the UV curing system 20 is activated, thereby curing at least a portion 36' of the layer of UV curable material 36 of the part undergoing fabrication in a region exposed to the UV light 48. In some instances, it will be unnecessary to move the device under fabrication because the layer of UV curable material 36 will already be within the oxygen-free region 44 when the gas is pumped through diffuser 30. In embodiments of the invention, the gas pumped through diffuser 30 is preferably an inert gas (e.g., Ar, $CO_2$, He, Ne, etc.) insofar as it does not interact with the photopolymer in UV curable layer 36 so as to inhibit curing thereof.

In some embodiments, the temperature of the feed gas may be controlled (e.g., through heating provided prior to gas inlets 28 and/or within the gas diffusion system 22) to create a uniform reaction temperature in the vicinity of workpiece 34 (e.g., within a space within which curing of the layer of UV curable material 36 disposed on the surface of the workpiece 34 will take place). For example, the inert gas may be heated prior to its introduction into the gas diffusion system 22 so as to maintain a desired and uniform reaction temperature within the vicinity of the surface of workpiece 34 on which the layer of UV curable material 36 is disposed.

Figure 4B:
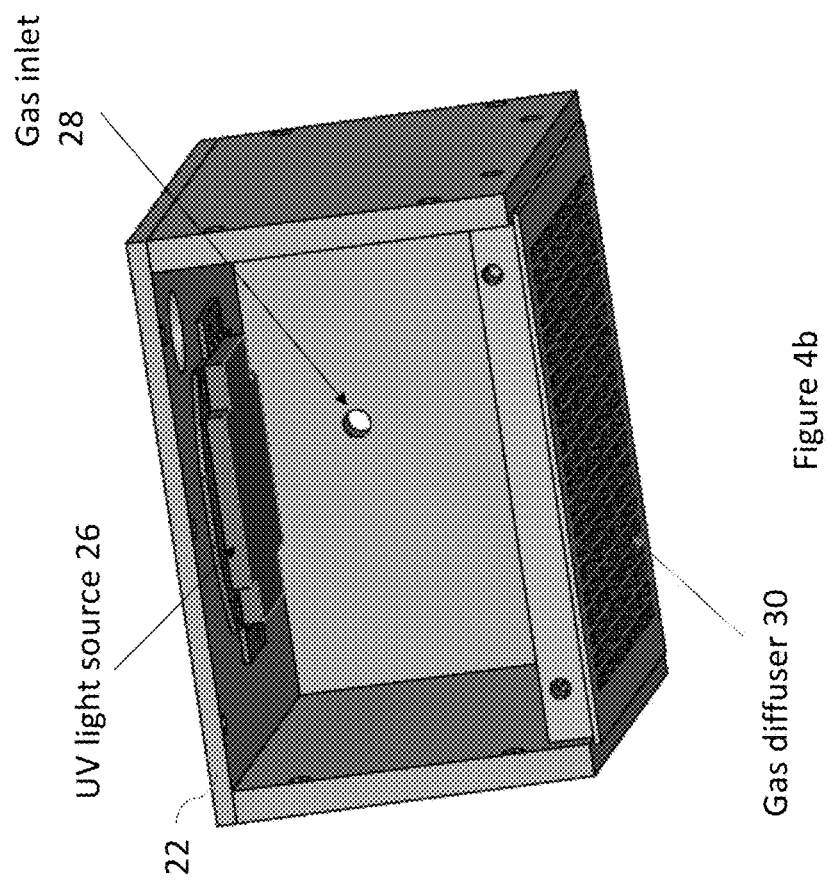
FIGS. 4a and 4b illustrate an example of a UV light source and gas diffuser arrangement for the UV curing system shown in FIG. 2.
Figure 4A:
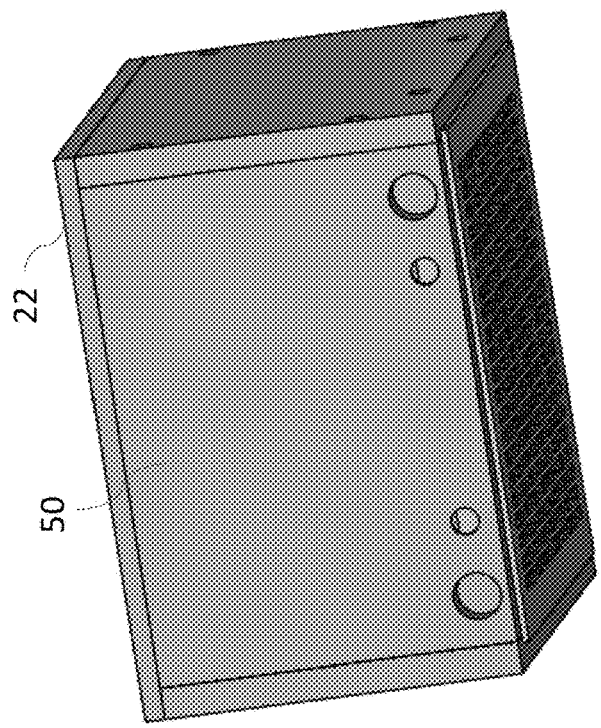

FIGS. 4a and 4b illustrate one example of a gas diffusion system 22. In FIG. 4a, a front cover 50 is in place, while in FIG. 4(b) it has been removed to show aspects of the interior of the gas diffusion system 22. In this example, gas diffusion system 22 is a rectilinear box having a UV light source 26, for example made up of one or more light emitting diodes (LEDs), mounted therein, inside a top of the box. A gas diffuser 30 forms a bottom face of the box. As mentioned above, the gas diffuser is made of a transparent (at the wavelengths of illumination necessary for curing of the photocurable material used to fabricate the part under construction) material to allow UV light from source 26 to pass through relatively unattenuated.

FIGS. 5a and 5b highlight the construction of diffuser 30. As noted above, bridges 42 (in the illustrated example, fashioned as ribs running longitudinally across an upper surface of the diffuser 30) are disposed above gas flow holes 38 so that they are in an optical path between the UV light source 26 and the gas flow holes when the diffuser and UV light source are assembled in the gas diffusion system 22. This ensures that across the entire curing area the UV light will pass through at least some thickness of the transparent material. This ensures better light homogeneity and more even curing of the photopolymer in UV curable layer 36.

Returning to FIG. 4b, gas enters (e.g., by action of a pumping arrangement) the diffusion system 22 via one or more inlet holes 28 and exits through the diffuser 30. A gas pressure homogenizer (not shown in this view) is used to ensure constant pressure throughout the system.

Figure 6A:
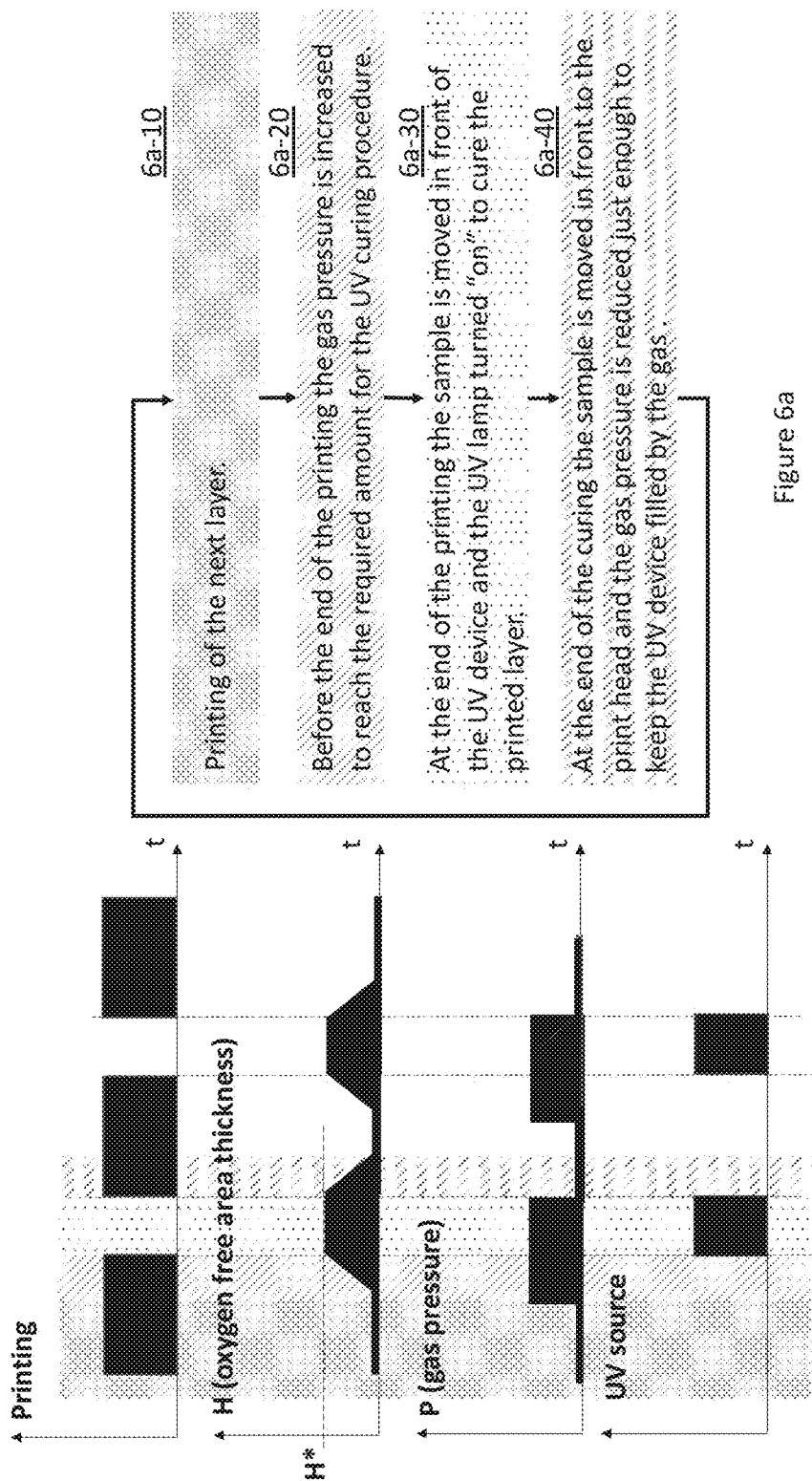
FIGS. 6a and 6b illustrate aspects of the operation of the UV curing system shown in FIG. 2, in particular a sequence of printing, inert gas flow, and UV curing processes (FIG. 6a), and the expanse of the oxygen free layer (FIG. 6b).
Figure 6B:
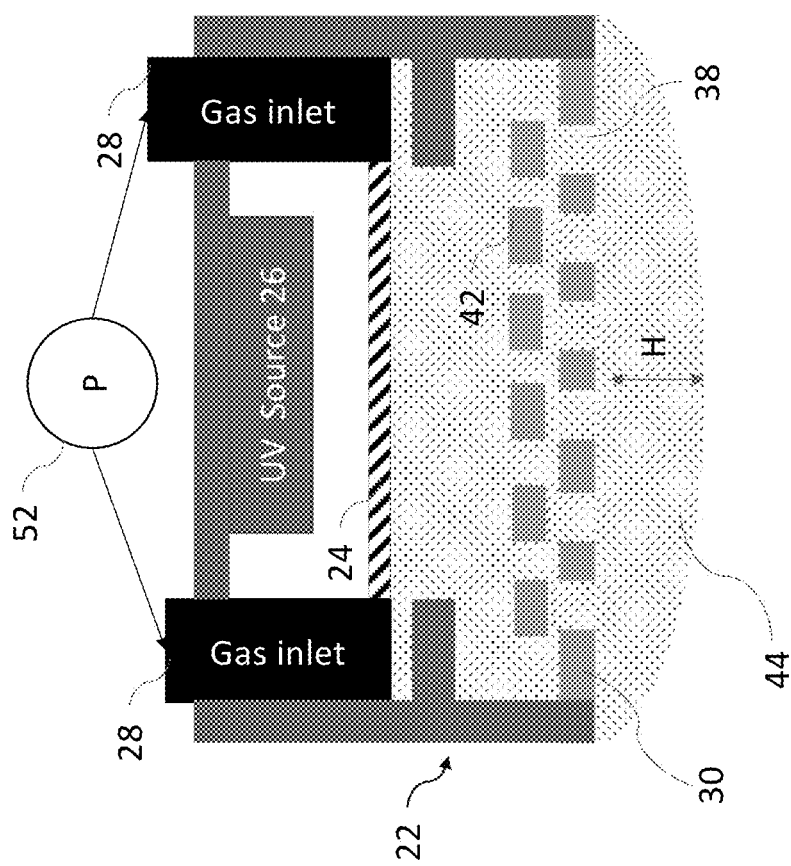

FIGS. 6a and 6b illustrate the cooperating operations employed in the printing and curing process. Printing of a next layer (6a-10) begins with the deposition of a layer of UV curable material on the print surface of an object under fabrication. Towards the end of this deposition, gas is pumped 52 through the diffuser 30 via the gas inlets 28, as shown in the gas pressure curve in FIG. 6a. The gas pressure increases to the level required for the curing process (6a-20) and purges the oxygen from a region 44 adjacent to the diffuser 30. The thickness (H) of this region grows over time, as shown in the oxygen free area thickness curve in FIG. 6a, and is related to the gas pressure as it is forced through the diffuser. When a desired thickness H* has been attained, the device under fabrication is raised (if necessary) so that the layer of UV curable material disposed on the workpiece is within the oxygen-free region 44, and the UV source 26 of the UV curing system 20 is then activated (6a-30), as shown in the UV source curve in FIG. 6a. This causes curing of at least a portion of the layer of UV curable material disposed on the workpiece in a region exposed to the UV light. At the conclusion of the curing (6a-40), the workpiece is repositioned for deposition of the next layer of UV curable material and the gas pressure reduced. Preferably, the gas pressure is maintained at a sufficient level to keep the diffusion system 22 filled in order to reduce the time necessary for the next cycle of curing. When the desired number of layers have been cured, the process ends.

Thus, systems that prevent oxygen inhibition of a light-initiated polymerization reactions by purging the oxygen from reaction surfaces using inert gas flow have been described.

What is claimed is:

1. A system for preventing oxygen inhibition of a light-initiated polymerization reaction at ambient conditions used by a three-dimensional (3D) printing system, said system comprising:
    an ultraviolet (UV) light source;
    a UV curing space for accepting a workpiece having a layer of UV curable material;
    means for purging oxygen from the UV curing space to facilitate, within the UV curing space, UV curing of the UV curable material at times when the UV light source emits UV light onto the layer of UV curable material, wherein the means for purging oxygen include a gas diffusion system for introducing an inert gas into a workspace between the UV light source and the layer of UV curable material of the workpiece; and
    a UV-transparent cover separating the UV light source and the workspace,
    wherein the gas diffusion system and the UV-transparent cover are arranged relative to one another so as to permit an inert gas flowing from one or more gas inlets of the gas diffusion system to flow out through a UV-transparent diffuser of the gas diffusion system towards the workspace,
    wherein the UV-transparent diffuser has a plurality of micro-holes, and
    wherein UV-transparent bridges of the gas diffusion system are arranged over said micro-holes so as to be positioned between respective entrances to the micro-holes and the UV-transparent cover.

2. The system of claim 1, further comprising a gas pressure homogenizer for ensuring a constant pressure throughout the system.

3. The system of claim 1, wherein the micro-holes are sized and spaced relative to one another so as to optimize a distribution of the inert gas and a distribution of the UV light throughout the workspace.

4. The system of claim 3, wherein the micro-holes are spaced relative to one another in an array so that the inert gas is approximately evenly distributed throughout the workspace and sized equally so that the UV light is approximately evenly distributed within the workspace.

5. The system of claim 1, wherein the micro-holes are spaced relative to one another in an array so that the gas is approximately evenly distributed throughout the workspace and the UV light is approximately evenly distributed within the workspace.

6. The system of claim 1, wherein the temperature of the inert gas is controlled to create a uniform reaction temperature.

7. A method for preventing oxygen inhibition of a light-initiated polymerization reaction at ambient conditions used by a three-dimensional (3D) printing system, said method comprising:
    periodically emitting an ultraviolet (UV) light from a UV light source into a UV curing space, in which a workpiece having a layer of UV curable photopolymer is disposed, to facilitate, within the UV curing space, UV curing of the UV curable photopolymer; and
    purging oxygen from the UV curing space at times when the UV light source emits the UV light onto the layer of UV curable photopolymer,
    wherein the purging of the oxygen from the UV curing space comprises introducing, via a gas diffusion system, an inert gas into a workspace between the UV light source and the layer of UV curable photopolymer of the workpiece, and
    wherein the inert gas is introduced via one or more gas inlets of the gas diffusion system and through a plurality of micro-holes of a UV-transparent diffuser of the gas diffusion system separating the UV light source and the workspace towards the workspace.

8. The method of claim 7, wherein the UV light from the UV light source is passed through UV-transparent bridges of the gas diffusion system arranged over said micro-holes of said UV-transparent diffuser towards the layer of UV curable photopolymer of the workpiece.

9. The method of claim 7, wherein the inert gas is approximately evenly distributed throughout the workspace via the micro-holes.

10. The method of claim 7, wherein the inert gas temperature is controlled to create a uniform reaction temperature.

11. The method of claim 7, wherein said inert gas is introduced with a pressure sufficient to purge oxygen from a region adjacent to the UV-transparent diffuser.

12. The method of claim 11, further comprising curing of the layer of UV curable material and after the layer of UV curable material has been cured, (i) repositioning the workpiece for deposition of a next layer of UV curable photopolymer and (ii) reducing a pressure of the inert gas in the region adjacent to the UV-transparent diffuser.

* * * * *